US006682788B2

(12) United States Patent
Saito et al.

(10) Patent No.: US 6,682,788 B2
(45) Date of Patent: *Jan. 27, 2004

(54) AQUEOUS COATING COMPOSITION, COATING METHOD THEREOF, AND INK-JET RECORDING SHEET

(75) Inventors: Yoichi Saito, Hino (JP); Masaru Tsuchiya, Hino (JP); Yoshihiro Mochizuki, Hino (JP); Keiji Ohbayashi, Hino (JP)

(73) Assignee: Konica Corporation (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 52 days.

This patent is subject to a terminal disclaimer.

(21) Appl. No.: 09/299,382

(22) Filed: Apr. 27, 1999

(65) Prior Publication Data

US 2003/0113514 A1 Jun. 19, 2003

(30) Foreign Application Priority Data

Apr. 30, 1998 (JP) .......................... 10-137509
Sep. 25, 1998 (JP) .......................... 10-271502

(51) Int. Cl.$^7$ .............................................. B32B 3/00
(52) U.S. Cl. ............................... 428/32.34; 428/32.31
(58) Field of Search .............................. 428/195, 304.4, 428/323, 331, 341, 342, 522, 32.31, 32.26, 32.1, 32.34

(56) References Cited

U.S. PATENT DOCUMENTS

| | | | | |
|---|---|---|---|---|
| 4,877,686 A | * | 10/1989 | Riou et al. ................. 428/514 |
| 5,418,078 A | * | 5/1995 | Desie et al. ................ 428/704 |
| 5,695,588 A | * | 12/1997 | Daems et al. .............. 156/247 |
| 6,037,050 A | * | 3/2000 | Saito et al. .............. 428/304.4 |
| 6,083,609 A | * | 7/2000 | Susaki et al. .............. 428/195 |
| 6,129,785 A | * | 10/2000 | Schliesman et al. ........ 106/482 |
| 6,153,305 A | * | 11/2000 | Uemura et al. ........... 428/478.2 |
| 6,165,606 A | * | 12/2000 | Kasahara et al. .......... 428/323 |

FOREIGN PATENT DOCUMENTS

EP 0813978 * 12/1997 ............ B41M/5/00

* cited by examiner

*Primary Examiner*—Cynthia H. Kelly
*Assistant Examiner*—Michael E. Grendzynski
(74) *Attorney, Agent, or Firm*—Muserlian, Lucas and Mercanti

(57) ABSTRACT

An aqueous coating composition is disclosed. The composition comprises fine organic particles, polyvinyl alcohol, and boric acids or salts thereof and comprising substantially no gelatin, and the same having a viscosity of 10 to 100 cp at 40° C., and a viscosity at 15° C., which is at least 20 times as much as that at 40° C. A coating method of the composition and an ink-jet sheet prepared by employing the composition are also disclosed.

16 Claims, No Drawings

AQUEOUS COATING COMPOSITION, COATING METHOD THEREOF, AND INK-JET RECORDING SHEET

FIELD OF THE INVENTION

The present invention relates to an aqueous coating composition containing inorganic fine particles and polyvinyl alcohol, espciaaly suitable for high speed drying, coating method thereof, coated product and an ink-jet recording sheet (hereinafter, occasionally referred to as recording sheet). The present invention also relates to an ink-jet recording sheet specifically having a void-type ink absorbing layer which specifically exhibits excellent water resistance, ink absorbability, and glossiness, and minimizes cracking.

BACKGROUND OF THE INVENTION

In recent years, the image quality of ink-jet recording has improved rapidly and is approaching that of photography. In order to achieve such photographic image quality employing ink-jet recording, improvement has been carried out with respect to the recording sheets. A recording sheet prepared by providing a fine void layer as an ink absorbing layer on an extremely smooth support is becoming one of sheets forming images most similar to photographic image quality, due to its high ink absorbability and excellent drying properties.

Generally employed as the extremely smooth support are supports which do not absorb ink, such as polyester film, polyolefin film, or paper supports covered with polyolefin. When an ink absorbing void layer is provided onto such a support that does not absorb ink, it is necessary to provide a coated layer having an adequate thickness in order to absorb sufficient ink. Generally, when a void layer is coated onto such a support that does not absorb ink, it is necessary to coat a layer having a dry thickness of at least 30 $\mu$m and preferably at least 35 $\mu$m.

When a layer is applied so as to obtain a dry layer thickness of at least 30 $\mu$m, it is necessary to apply a layer having a large wet thickness of at least 100 $\mu$m, and generally of at least 130 $\mu$m.

When an aqueous coating composition is coated onto a support so as to obtain such a large wet thickness, problems occur such that drying takes long time and non-uniformity tends to result due to the unevenness of the coated composition during drying.

Water, which is a major solvent in an aqueous solution, has a relatively high boiling point. Therefore, when drying is carried out employing only a thermal process, a remarkably long drying time as well as a huge drying zone is required.

On the other hand, while drying is carried out over such a long time, the coated composition moves locally due to various causes, so that a non-uniform coated surface is formed due to the formation of the so-called unevenness of the coated composition. When the unevenness of the coated composition occurs, the coated surface becomes non-uniform, and consequently, because a thick area is wound prior to complete drying, serious manufacturing problems may occur.

As an example in which a thick wet layer is formed by coating an aqueous coating composition, is listed the coating of a silver halide photographic emulsion comprising gelatin as a hydrophilic binder. An aqueous gelatin solution is generally in an aqueous solution state at at least 30° C., but exhibits gelled characteristic below 20 to 25° C. Utilizing this characteristic, after an aqueous solution comprising gelatin is applied onto a support, the resulting coating is chilled, and gells. Thereafter, the coating can be dried with strong blasts of air heated to a relatively low temperature (of about 20 to about 60° C.). Accordingly, gelatin can be dried within a relatively short period of time, irrespective of the wet layer thickness.

In the case of a coating layer in which gelatin can be employed, it is possible to carry out rapid drying, utilizing the characteristic of gelatin. However, in the case of the coating composition which forms a void layer, gelatin is not applicable as a major hydrophilic binder.

Namely, when gelatin is employed as a major binder in the void layer, during ink-jet recording, ink swells the gelatin to immediately clog the voids. As a result, the advantages of the voids cannot be utilized.

A technique has not been discovered, which can uniformly and highly productively coat a void layer having a large thickness, without employing gelatin in a substantial portion.

Ink-jet recording is carried out in such a manner that fine droplets of ink are allowed to fly employing various working principles and are adhered onto a recording sheet such as a sheet of paper to record images and characters. Ink-jet recording exhibits advantages such as relatively high speed, low noise, ease of multicolor production, and the like.

Conventional problems of this system regarding clogging of nozzles and maintenance have been solved by improving both aspects of ink and the device, and at present, ink-jet recording has been rapidly applied to a variety of fields such as various printers, facsimile machines, computer terminals, and the like.

Requirements for a recording sheet employed in such ink-jet recording system is that the density of printing dots is high; color tone is bright and clear; ink is rapidly absorbed and when printing dots are superimposed, ink should neither run out nor blot; the diffusion of a printing dot in the lateral direction should not be greater than that needed and the circumference should be smooth and result in no blurring; and the like.

Particularly, at low rates of ink absorption, when recording is carried out by superimposing at least two color inks, on a recording sheet, droplets result in repellence to cause unevenness and in the boundary area of different colors, mutual colors result in blurring. As a result, image quality tends to be markedly degraded. Therefore, it is required that the recording sheet exhibit high ink absorbability.

In order to solve these problems, conventionally, a great number of techniques have been proposed.

For example, Japanese Patent Publication Open to Public Inspection No. 52-53012 describes a recording sheet in which minimally sized base paper is damped with paint employed for surface treatment; Japanese Patent Publication Open to Public Inspection No. 55-5830 describes a recording sheet comprising a support in which an ink absorbing coating layer is provided on the surface of the support; Japanese Patent Publication Open to Public Inspection No. 56-157 describes a recording sheet comprising a covering layer containing non-colloidal silica powder as a pigment; Japanese Patent Publication Open to Public Inspection No. 57-107873 describes a recording sheet comprising an inorganic pigment and an organic pigment in combination; Japanese Patent Publication Open to Public Inspection No. 58-110287 describes a recording sheet which exhibits a void distribution with two peaks; Japanese Patent Publication Open to Public Inspection No. 62-111782 describes a recording sheet composed of an upper porous layer and a lower porous layer; Japanese Patent Publication Open to Public Inspection Nos. 59-68292, 59-123696, 60-18383, etc. describe a recording sheet having amorphous cracking; Japanese Patent Publication Open to Public Inspection Nos. 61-135786, 61-148092, 62-149475, etc. describe a recording sheet having a fine powder layer; Japanese Patent Publication Open to Public Inspection Nos. 63-252779, 1-108083, 2-136279, 3-65376, 3-27976, etc. describe a recording sheet comprising pigments and fine silica particles having specified physical parameters; Japanese Patent Publication Open to Public Inspection Nos. 57-14091, 60-219083, 60-210984, 61-20797, 61-188183, 5-278324, 6-92011, 6-183134, 7-137431, 7-276789, etc. describe a recording sheet containing fine silica particles such as colloidal silica; Japanese Patent Publication Open to Public Inspection Nos. 2-276671, 3-67684, 3-215082, 3-251488, 4-67986, 4-263983, 5-16517, etc. describe a recording sheet containing fine hydrated alumina particles, and the like.

Most of them are ink-jet recording sheets in which an ink absorbing layer has a void structure.

On the other hand, in ink-jet recording, in order to improve the water resistance of the obtained images, various methods are employed in which a cationic material is incorporated into an ink receptive layer, and the dye is subsequently fixed.

However, in the above-mentioned ink receptive layer having a void structure, when the materials forming the void structure are fine cationic inorganic particles, problems occur such that cationic colloidal silica hardly achieves a high void ratio, or fine alumina hydrate particles are employed to result in high production cost.

On the other hand, when relatively low cost commercially available fine organic particles, for example, fine surface-anionic silica particles are employed, and are mixed with a cationic polymer solution which provides water resistance for these, coagula tend to be formed between the surface-anionic fine inorganic particles and the cationic polymer. When a coating composition containing a number of such coarse coagula is employed as they are, defects such as a decrease in glossiness or cracking tend to occur.

Most of such coarse coagula can then be removed through dispersion, utilizing mechanical dispersion means. However, depending on the mixing method of the cationic polymer with fine inorganic particles, dispersion occasionally requires a great deal of energy and time.

Specifically, when polyvinyl alcohol is used as a hydrophilic binder, the void structure tends to be formed employing only a relatively small amount. In this case, when boric acid is used as a hardener, the layer forming properties are improved, which decreases cracking. However, even in this case, when the method for adding the hardener is inappropriate, gel-like foreign matter is formed during addition, and when coating is carried out without fully dispersing the gel-like material, on the contrary, cracking occasionally tends to be increased due to this.

Japanese Patent Publication Open to Public Inspection No. 10-181190 describes a recording sheet with excellent glossiness and increased print density, which is prepared by coating, onto a support, a coating composition comprising a pigment obtained by pulverize-dispersing a coagulated pigment, at an average diameter of no more than 500 nm, in a cationic polymer-containing solution.

Japanese Patent Publication Open to Public Inspection No. 10-181191 describes a recording sheet which is prepared by coating, onto a support, a coating composition which is prepared in such a manner that a dispersion which comprises a pigment having an average diameter of no more than 300 nm is added with a cationic polymer, thickened and coagulated, and the resulting coagulum is pulverized into an average diameter of no more than 1 $\mu$m, and then dispersed.

Japanese Patent Publication Open to Public Inspection No. 10-71764 describes a recording sheet comprising secondary coagulated particles (such as silica) having an average diameter of 10 to 150 nm, which are formed by coagulating primary particles having a diameter of 3 to 40 nm.

However, in the above-mentioned publications, polyvinyl alcohol is employed as a hydrophilic binder, in the examples, but hardeners such as boric acid, etc. are not employed. As a result, it is difficult to state that sufficient glossiness and improvement of cracking are achieved.

Specifically, when a support is not water-absorbable, the inventors of the present invention have found that such cracking tends to be caused. Thus, when a polyethylene-coated paper support is employed, which provides improved quality prints, techniques are demanded which minimize cracking to improve layer forming properties.

SUMMARY OF THE INVENTION

A first object of the present invention is to provide an aqueous coating composition which is suitable for coating and rapid drying as a coated material having a large dry layer thickness without substantially comprising gelatin.

A second object of the present invention is to provide a coating method which can form a coated layer surface which is even and uniform without the unevenness of coated compositions.

The other object of the present invention is to provide a recording sheet which is excellent in glossiness, minimizes cracking, and exhibits excellent water resistance.

The present invention and embodiments thereof will be describes below.

An aqueous coating composition comprising fine inorganic particles, polyvinyl alcohol, and boric acids or salts thereof and comprising substantially no gelatin, and the same having a viscosity of 10 to 100 cp at 40° C., and a viscosity at 15° C., which is at least 20 times as much as that at 40° C.

Herein, the fine inorganic particles are preferably fine silica particles which are synthesized employing a gas phase method.

The pH is preferably between 3.5 and 6.0.

The ratio of fine inorganic particles to polyvinyl alcohol is preferably between 3 and 10.

The above-mentioned aqueous coating composition is preferably applied to a support at 35 to 50° C. After the temperature of the coating composition is chilled to no more than 20° C., drying is carried out with blown air at a temperature of at least 20° C.

The ink-jet recording sheet can be obtained by coating, onto a support, a coating composition which is obtained by mixing a cationic polymer-containing solution, a fine inorganic particle dispersion, and an aqueous boric acid salt solution, followed by adding an aqueous low-polymerized polyvinyl alcohol solution, and an aqueous high-polymerized polyvinyl alcohol solution in the listed order into the resulting dispersion.

The ink-jet recording sheet can be obtained by coating the above-mentioned coating composition onto the support;

then chilling the coated layer temporarily to no more than 20° C., and thereafter, drying the chilled layer at a temperature of 20 to 70° C.

The coating composition is preferably prepared in such steps of
adding inorganic fine particle dispersion to cationic polymer containing solution,
adding to resulting dispersion aqueous solution of boric acid,
adding the low-polymerized polyvinyl alcohol solution and aqueous high-polymerized polyvinyl alcohol solution in this order.

DETAILED DESCRIPTION OF THE INVNETION

The aqueous coating composition of the present invention comprises fine inorganic particles. Listed as examples of such fine inorganic particles can be white inorganic pigments such as soft calcium carbonate, heavy calcium carbonate, magnesium carbonate, kaolin, clay, talc, calcium sulfate, barium sulfate, titanium dioxide, zinc oxide, zinc hydroxide, zinc sulfide, zinc carbonate, hydrotalcite, aluminum silicate, diatomaceous earth, calcium silicate, magnesium silicate, synthesized amorphous silica, colloidal silica, alumina, colloidal alumina, pseudoboehmite, aluminum hydroxide, lithopone, zeolite, magnesium hydroxide, etc.

Such fine inorganic particles may be employed in the form of primary particles as they are, and in the form of secondary aggregated particles.

In the present invention, because it is easy to increase the viscosity at a low temperature such as no more than 20° C., as fine inorganic particles, fine silica particles synthesized employing a gas phase method are particularly preferred.

The fine silica particles, synthesized employing a gas phase method, are silica powder having a primary particle diameter of 5 to 500 nm, which are generally prepared by combusting silicone tetrachloride together with hydrogen and oxygen at a high temperature. In the present invention, those having a primary particle diameter of no more than 50 nm are particularly preferred, in terms of luster.

Examples of such gas phase method silica, which is available on the market, include various types of Aerojiru marketed by Nihon Aerojiru Co.

The above-mentioned silica, synthesized employing a gas phase method, may be one in which the surface is cation-modified, one which is treated with Al, Ca, Mg, Ba, etc., and one in which a part of the surface is modified to be hydrophobic.

As for the particle diameter of the above-mentioned fine inorganic particles, in order to enhance the rate of the viscosity variation with respect to the variations of temperature of the coating composition, an average diameter is preferably no more than 1 $\mu$m, and is more preferably no more than 0.2 $\mu$m.

As for the particle diameter, from the viewpoint of the production of particles, the diameter is commonly no less than 3 nm, and is preferably no less than 6 nm.

The average particle diameter of the above-mentioned fine inorganic particles is obtained by observing the particles themselves, the cross section or surface of the void layer employing an electron microscope, and measuring the diameters of 100 randomly selected particles, and calculating the simple average (number average). Each particle diameter as described herein denotes the diameter of an assumed circle which has the same projection area as each particle.

As the most preferably employed silica having an average diameter of primary particles of 4 to 20 nm, which is synthesized using the gas phase method, for example, Aerojiru of Nihon Aerojiru Co. is commercially available. This gas phase method silica can be readily dispersed into primary particles through suction-dispersion employing a jet stream inductor mixer manufactured by Mitamura Riken Kogyo Co., Ltd.

The content of the above-mentioned fine inorganic particles in an aqueous coating composition is generally between 3 and 20 weight percent, and is most preferably between 5 and 15 weight percent from the viewpoints of increasing the viscosity at a low temperature, and maintaining an optimal viscosity during coating.

In the aqueous coating composition of the present invention, as a binder, polyvinyl alcohol is employed.

Polyvinyl alcohols employed in the present invention include, other than common polyvinyl alcohols prepared by hydrolyzing polyvinyl acetate, modified polyvinyl alcohols such as polyvinyl alcohol in which the terminal is cation-modified, anion-modified polyvinyl alcohol having an anionic group, etc.

Of polyvinyl alcohols prepared by hydrolyzing vinyl acetate, those having an average degree of polymerization of at least 300 are preferably employed, and those having an average degree of polymerization of 1,000 to 4,000 are most preferably employed.

Those having a saponification degree of 70 to 100 percent are preferred and those having 80 to 99.5 percent are particularly preferred.

The cation-modified polyvinyl alcohols include, for example, polyvinyl alcohols having a primary to tertiary group or a quaternary ammonium group in the main chain or a side chain of the above-mentioned polyvinyl alcohols, as described in Japanese Patent Publication Open to Public Inspection No. 61-10483, which are prepared by saponifying a copolymer of ethylenic unsaturated monomers having a cationic group with vinyl acetate.

Listed as ethylenic unsaturated monomers having a cationic group are, for example, trimethyl-(2-acrylamide-2,2-dimethylethyl)ammonium chloride, trimethyl-(3-acrylamide-3,3-dimethylpropyl)ammonium chloride, N-vinylimidazole, N-vinyl-2-methylimidazole, N-(3-dimethylaminopropyl)methacrylamide, hydroxylethyldimethyl(3-methacrylamide)ammonium chloride, trimethyl-(3-methacrylamidopropyl)ammonium chloride, N-(1,1-dimethyl-3-dimethylaminopropyl) acrylamide, etc.

The content ratio of the monomer containing a cation-modified group in cation-modified polyvinyl alcohol is between 0.1 and 10 mole percent of vinyl acetate, and is preferably between 0.2 and 5 mole percent.

Listed as examples of monomers having a quaternary ammonium salt group can be, for example, those described below.

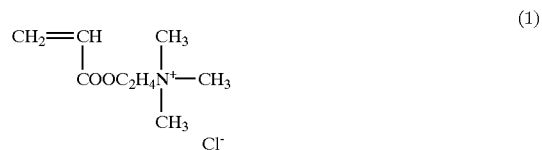

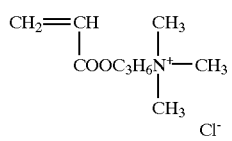 (2)
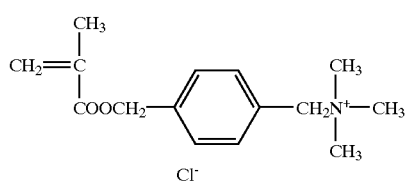 (3)
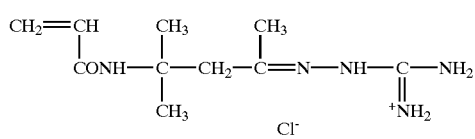 (4)
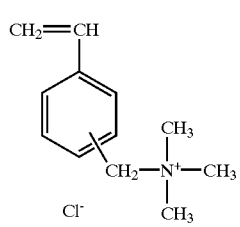 (5)
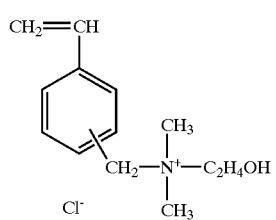 (6)
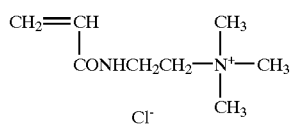 (7)
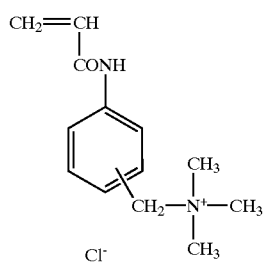 (8)
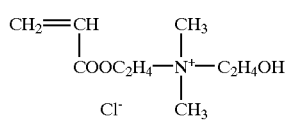 (9)
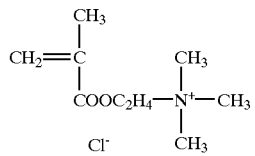 (10)
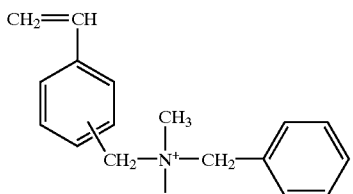 (11)
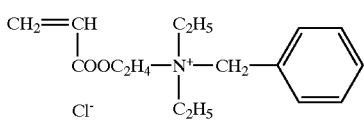 (12)
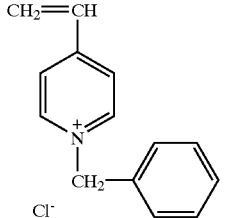 (13)
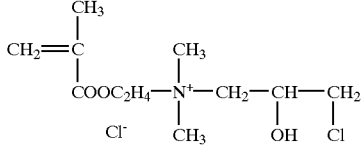 (14)
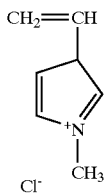 (15)
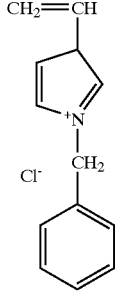 (16)
A monomer which can copolymerize with the above-mentioned quaternary ammonium salt group is a compound having an ethylenic unsaturated group for which the following specific examples can be listed.
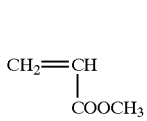 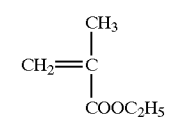 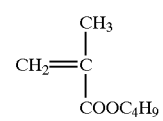
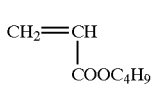 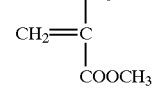

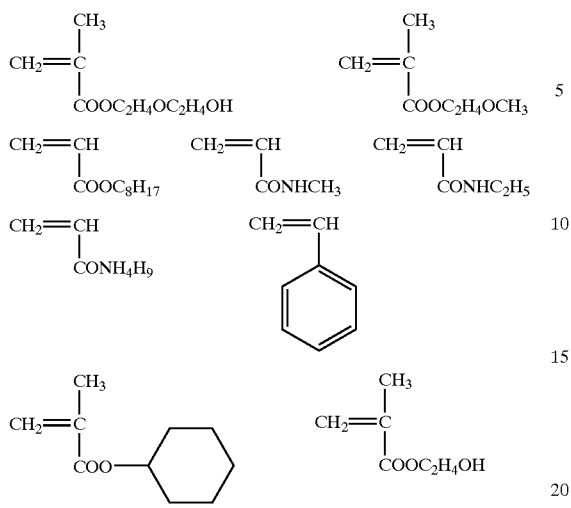
Specific examples of the cationic polymers of the present invention are shown below.
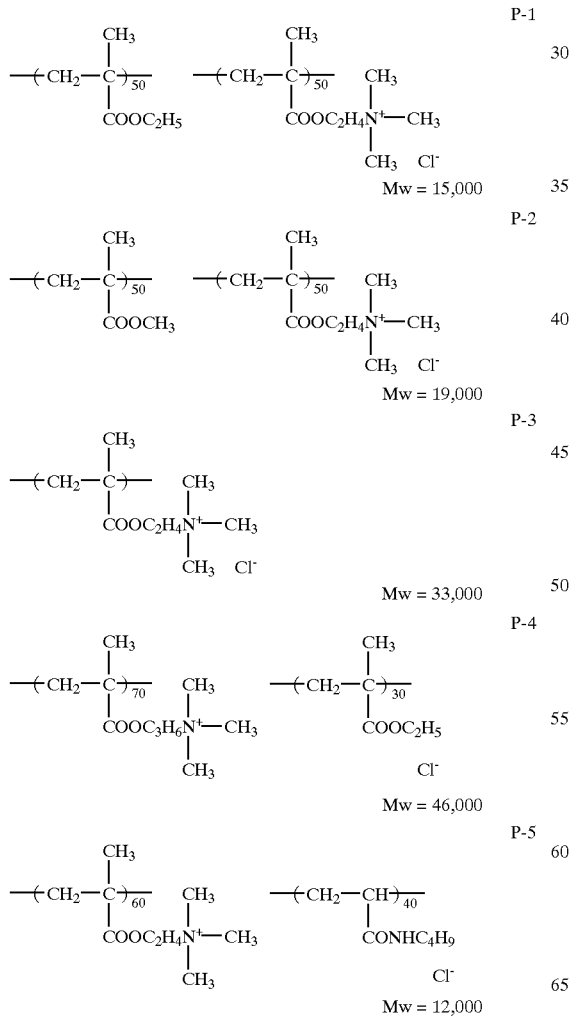
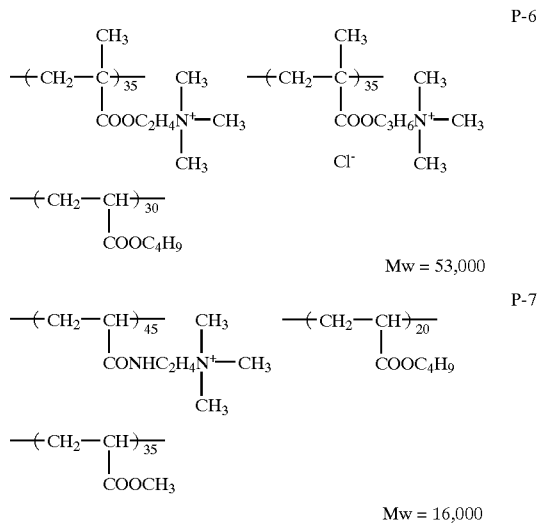
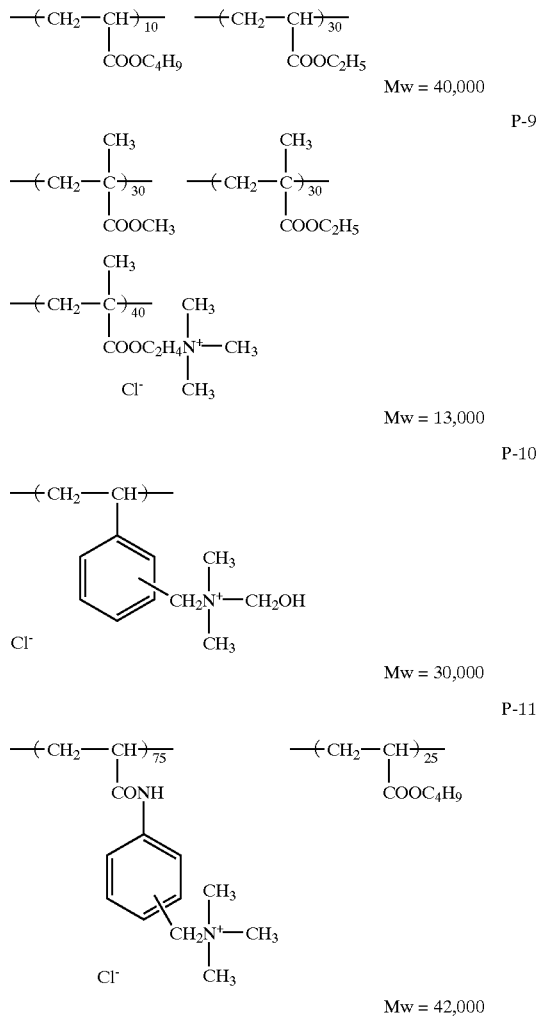

-continued

P-12
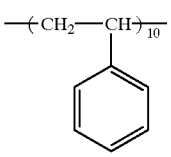
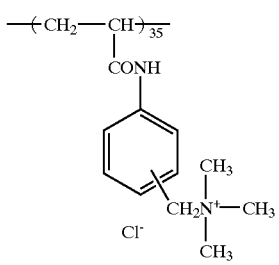

P-13
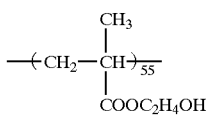

Mw = 16,000

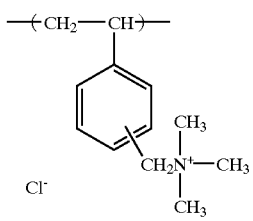

Mw = 9,000

P-14

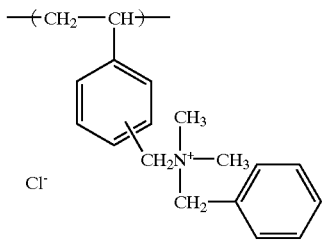

Mw = 9,000

P-15

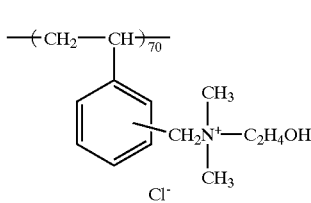

Mw = 32,000

P-16

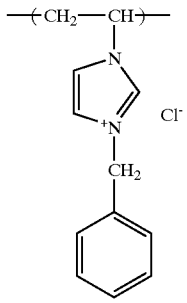

Mw = 50,000

-continued

P-17
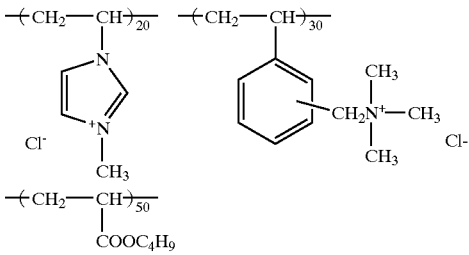
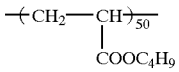

Mw = 24,000

Specifically, when the cationic polymer having a quaternary ammonium group is a copolymer, the content ratio of the cationic monomer is generally at least 10 mole percent; is more preferably at least 20 mole percent, and is most preferably at least 30 mole percent.

The monomers having a quaternary ammonium salt group may be one or more types.

Generally, the above-mentioned cationic polymer having a quaternary ammonium salt group is highly soluble in water. A copolymerizable monomer having no quaternary ammonium salt group is occasionally not highly soluble in water, depending on the monomer composition or the content ratio. However, those which are soluble in a mixed solvent consisting of a water-miscible organic solvent and water, may be employed in the present invention.

Water-miscible solvents as described herein are organic solvents which are at least 10 percent soluble in water, including alcohols such as methanol, ethanol, isopropanol, n-propanol, etc.; glycols such as ethylene glycol, diethylene glycol, glycerin, etc.; esters such as ethyl acetate, propyl acetate, etc.; ketones such as acetone, methyl ethyl ketone, etc.; amides such as N,N-dimethylformamide, etc. In this case, the employed amount of the organic solvent is less than water.

The weight average molecular weight of the cationic polymer of the present invention is preferably no more than 100,000.

The weight average molecular weight as described herein is a value in terms of a polyethylene glycol obtained using gel permeation chromatography.

With the weight average molecular weight exceeding 100,000, when a cationic polymer solution is added to a dispersion containing fine inorganic particles having an anionic surface, coagula are markedly formed. Thereafter, even though a dispersion treatment is carried out, it is difficult to prepare a uniform dispersion due to the presence of a number of coarse grains. When an ink-jet recording sheet is prepared using the fine composite particle dispersion which comprises such a cationic polymer along with fine inorganic particles, excellent glossiness is difficult to obtain. The particularly preferred weight average molecular weight is no more than 50,000.

The weight average molecular weight is preferably at least 2,000 in terms of the water resistance of a dye.

The ratio of the above-mentioned fine inorganic particles to the cationic polymer is variable depending on the types of fine inorganic particles and the particle diameter, and types of cationic polymers or the weight average molecular weight.

In the present invention, the above-mentioned ratio is preferably between 1:0.01, and 1:1 in order to stabilize the surface of the fine inorganic particles while they are replaced with the cationic property.

When the amount of the cationic polymer is small, the anionic component of the fine organic particles is not perfectly covered, and is left as it is. As a result, the anion portion of the fine inorganic particles combine with the cationic portion of the cationic polymer, which tends to form coarse grains.

In the present invention, eventually, an excessive cationic portion is preferably formed by gradually replacing the anionic portion of the fine organic particles having an anionic surface with the cationic portion of the cationic polymer. In order to carry this out, the method for adding the fine inorganic particle dispersion and the cationic polymer is important, and it is preferable to add the fine inorganic particle dispersion to an aqueous cationic polymer solution.

On the contrary, when the aqueous cationic polymer solution is added, with stirring, to the fine inorganic particle containing dispersion, during addition, the mixed composition results in one large coagulum which makes it almost impossible to continue stirring. The reason for this is not yet understood. However, it is believed that as the cationic polymer is gradually added to a composition which is maintained to be anionic, anions decrease gradually and the entire composition forms a gigantic coagulum due passing the electrically neutral range during the addition.

Anion-modified polyvinyl alcohols include, for example, polyvinyl alcohols having an anionic group as described in Japanese Patent Publication Open to Public Inspection No. 1-206088, copolymers of vinyl alcohol with vinyl compounds having a water-soluble group as described in Japanese Patent Publication Open to Public Inspection Nos. 61-237681 and 63-307979, and modified polyvinyl alcohols having a water-soluble group as described in Japanese Patent Publication Open to Public Inspection No. 7-285265.

Furthermore, nonion-modified polyvinyl alcohols include, for example, polyvinyl alcohol derivatives in which a polyalkylene oxide group is added to a part of vinyl alcohol as described in Japanese Patent Publication Open to Public Inspection No. 7-9758, block copolymers of vinyl compounds having a hydrophobic group with vinyl compounds described in Japanese Patent Publication Open to Public Inspection No. 8-25795, etc.

Polyvinyl alcohols having various degrees of polymerization and various types of modification may be employed in combination of two or more.

The content of the above-mentioned polyvinyl alcohol in the aqueous coating composition of the present invention can vary widely depending on the types of polyvinyl alcohols, the types and amounts of fine inorganic particles, etc., however, it is generally between 1 and 10 weight percent, and is most preferably between 0.3 and 5 weight percent.

Further, in order to increase viscosity at a low temperature and to form an excellent coated surface, the weight ratio of fine inorganic particles to polyvinyl alcohol is preferably between 3 and 10.

Into the aqueous coating composition of the present invention, polyvinyl alcohol is incorporated as a major binder. However, if the effect of the present invention, that is, no marked adverse effect on an increase in low temperature viscosity is exhibited, other hydrophilic binders may be employed.

Listed as such hydrophilic binders are gelatin, polyethylene oxide, polyvinyl pyrrolidone, polyacrylic acid, polyacrylamide, polyurethane, dextran, dextrin, carageenan (λ, τ, λ), agar, Pullulan, water-soluble polyvinyl butyral, hydroxyethyl cellulose, carboxymethyl cellulose, etc.

The ratio of these hydrophilic binders to polyvinyl alcohol is preferably about no more than 20 weight percent, and is more preferably no more than 10 weight percent.

In order to increase viscosity at a low temperature, boric acids, or salts thereof, are incorporated into the aqueous coating composition of the present invention. The boric acids and salts thereof include oxygen acids having a boron atom as a central atom and salts thereof, specifically, orthoboric acid, metaboric acid, hypoboric acid, tetraboric acid, pentaboric acid, and salts thereof.

The employed amount of boric acids, or salts thereof, may vary widely depending on the concentration of fine inorganic particles, polyvinyl alcohol in a coating composition, the pH, etc., however, it is generally between about 1 and 60 weight percent, and is preferably between 5 and 40 weight percent.

In the aqueous coating composition of the present invention, the fine inorganic particles, polyvinyl alcohol, and boric acid or salts thereof are indispensable components to enhance the viscosity at a low temperature.

Though the reasons for a rapid increase in the viscosity at a low temperature are not totally understood yet, the inventors of the present invention consider the probable reasons as follows.

Namely, a hydrogen bond between the oxygen atom or hydrogen atom of fine inorganic particles and the hydrogen atom or oxygen atom of the hydroxyl group of polyvinyl alcohol, a relatively weak bond between polyvinyl alcohol and boric acid or salt thereof, etc. are complexly intertwined, and at a low temperature, a relatively strong bond is formed to increase the viscosity, while at a higher temperature, the resulting bond weakens to decrease the viscosity.

Accordingly, if any one of fine inorganic particles, polyvinyl alcohol, and boric acid or salt thereof is not present, the rapid increase in viscosity at a low temperature, as obtained in the present invention, does not occur.

Generally, as the temperature of an aqueous coating composition is lowered, the viscosity increases. However, when any one of the above-mentioned three types of materials is not included, an increase in viscosity is at most 10 times as great at 15° C. compared to 40° C.

In this case, the pH of the aqueous coating composition exhibits a relatively large effect on the surface charge of the fine inorganic particles, the degree of hydration of the hydroxyl group of polyvinyl alcohol or dissociation of boric acid, and is preferably between 3.5 and 6.0.

The above-mentioned pH is preferred because desirable viscosity is obtained at a low temperature, and also because a coating composition which is easily applied is obtained.

A pH between 3.5 and 5.5 is particularly preferred.

Compounds which regulate the viscosity of the aqueous coating composition of the present invention include surface active agents, water-miscible organic solvents, and polymer latex.

Of these, the surface active agent and water-miscible organic solvent are employed as a means to decrease the viscosity of the coating composition. Furthermore, on the contrary, the polymer latex is employed as a means to increase the viscosity.

As for the surface active agents, when the coating composition is cationic, cationic or nonionic surface active agents are employed, while when the coating composition is anionic, nonionic or anionic surface active agents are employed. The added amount of the surface active agent varies widely for the viscosity to be adjusted, however, it is generally between 0.01 and 10 g per liter of the coating composition.

Water-miscible organic solvents include alcohols such as methanol, ethanol, n-propanol, i-propanol, etc.; ketones such as acetone, methyl ethyl ketone, etc.; esters such as ethyl acetate, propyl acetate, etc.; amides such as N,N-dimethylformamide, etc.; polyols such as ethylene glycol, diethylene glycol, glycerin, etc.

The employed amount of the water-miscible organic solvent is generally between 0.1 and 30 ml per liter of a coating composition.

As the polymer latex, various types such as silicone oil, acrylic series latex, urethane series latex, etc. can be employed.

However, because the above-mentioned means vary the viscosity in both the high temperature state and the low temperature state, in order to maintain viscosity at both states, appropriate conditions should be selected from the above-mentioned means.

The viscosity of the coating composition of the present invention is maintained in the range of 10 to 100 cp at 40° C., employing the above-mentioned viscosity-controlling means, and increase as the composition is chilled.

Viscosity shown herein is measured employing a B-type viscometer.

In order to obtain the effects of the present invention, as for viscosity when the composition is chilled, it is necessary that the viscosity at 15° C. be at least 20 times as much as at 40° C., preferably at least 50 times, and more preferably at least 100 times as much.

During the addition of the aqueous boric acid salt solution, when its pH and the pH of a fine inorganic particle dispersion are higher than that of a cationic polymer solution, quite coarse coagula are markedly formed. Accordingly, it is particularly preferred that the fine inorganic particle dispersion is added to the aqueous cationic polymer solution.

When the pH of a boric acid salt solution is no less than 3 higher than that of a solution obtained by mixing the aqueous cationic polymer solution with the fine inorganic particle dispersion, the addition is preferably carried out in the order cited above.

When fine inorganic particles are gradually added to the aqueous cationic polymer solution, the resulting mixture is maintained to be cationic as a whole to result in a relatively uniform dispersion.

In such cases, during the process of adding fine inorganic particles, it is preferred to employ sufficient stirring, and if necessary, it is preferred to employ a homogenizer in combination in view of production efficiency.

Furthermore, in order to enhance the stirring efficiency, a method is useful in which the fine inorganic particle dispersion and the aqueous boric acid salt solution described below are directly added to the aqueous cationic polymer solution.

The fine inorganic particle dispersion is mixed with the aqueous cationic polymer solution, and in the present invention, prior to the dispersion, a boric acid salt is added.

In the preferred embodiment of the present invention, after fine inorganic particles are gradually added into an aqueous polymer solution, or prior to the completion of the addition, a boric acid salt is added into the resulting mixture. Boric acid salts as described herein refer to boric acids and salts thereof, and boric acid salts include oxygen acids having a boron atom as a central atom and salts thereof, specifically, orthoboric acid, diboric acid, metaboric acid, tetraboric acid, pentaboric acid, octaboric acid, and salts thereof.

The amount of the above-mentioned boric acid salts used varies, depending on the degree of saponification and polymerization of polyvinyl alcohol, the types of fine inorganic particles, the ratio of fine inorganic particles to polyvinyl alcohol, the types of cationic polymers, the amount thereof, and further, on the pH of coating compositions, etc. However, the general amount is between 20 and 500 mg per g of polyvinyl alcohol, and is preferably between 50 and 300 mg.

The boric acid salt is most preferably added after completing the addition of a fine inorganic particle dispersion. However, it may be added prior to completing the addition of the fine inorganic particle dispersion, for example, after adding approximately more than one half of the fine inorganic particles. Furthermore, an aqueous boric acid salt solution as well as an aqueous fine inorganic particle dispersion may be simultaneously added.

Boric acid salts may be used individually or in combination of two or more in an aqueous solution. An aqueous solution comprising boric acid and borax, in combination, is particularly preferred.

Due to the low solubility of boric acid and of borax in water, it is required to employ a relatively low concentration of an aqueous boric acid solution and an aqueous borax solution. However, both may be dissolved in water in combination, so that an aqueous solution having a high concentration can be prepared, and thereby the coating composition can also be concentrated. Furthermore, advantage results in which the pH of the added aqueous solution can be relatively freely controlled.

In the mixture prepared as described above, microscopically, there are a number of tiny undissolved flour-like coagula. It is assumed that these coagula are formed due to the presence of an unstable state, in terms of electrical charge, caused by the localized shortage of the cationic polymer to the fine inorganic particles, in the aera where the fine inorganic particle dispersion is added, and due to localized variations in the pH and also due to an increase in salt concentration upon adding boric acid salt.

Such tiny undissolved flour-like coagula are removed by employing a mechanical dispersion treatment carried out later. By carrying out such a dispersion treatment, is obtained a cation-modified fine inorganic particle dispersion having the targeted particle diameter of the fine inorganic particles. If the particles of an added fine inorganic particle dispersion are previously dispersed the into primary particles, the resulting particles herein can generally be dispersed into the primary particles.

Employed as such dispersion methods can be various types of homogenizers known in the art, such as high speed rotation homogenizers, medium-stirring type homogenizers (a ball mill, a sand mill, etc.), ultrasonic homogenizers, colloid mill homogenizers, roll mill homogenizers, high pressure homogenizers, etc. In the present invention, in terms of efficiently dispersing the undissolved flour-like fine particles, the ultrasonic homogenizer or high pressure homogenizer is preferably employed.

An ultrasonic homogenizer generally generates ultrasonic waves at 20 to 25 kHz and concentrates the energy at an interface between solid and liquid to carry out dispersion. Even though the dispersion is very efficiently accomplished, it is not suitable to prepare a large amount of dispersion.

On the other hand, a high pressure homogenizer is constructed in such a manner that at the exit of a high pressure pump, having 3 or 5 pistons, one or two twisted homogeneous valves are provided in which the gap can be adjusted, employing oil pressure. Pressure is applied to a liquid medium conveyed by the high pressure pump while the flow is narrowed employing the homogeneous valve, and when passing the homogeneous valve, tiny undissolved flour-like particles are pulverized.

This dispersion method can continually disperse a large amount of liquid, and thus is most preferably employed to produce a large amount of liquid. The pressure applied to the homogeneous valve is generally between 50 and 1,000 kg/cm$^2$ and the dispersion may be completed by one pass or many repeated passes.

The above-mentioned dispersion methods can also be employed in combinations of two or more.

When the above-mentioned dispersion is prepared, various types of additives may be added for preparation.

For example, employed can be, if desired, various nonionic or cationic surface active agents (anionic surface active agents are not preferred because of the formation of coagula), antifoaming agents, nonionic hydrophilic polymers (polyvinyl alcohol, polyvinylpyrrolidone, polyethylene oxide, polyacrylamide, various types of saccharides, gelatin, Pullulan, etc.), nonionic or cationic latex dispersion, water-miscible organic solvents (ethyl acetate, methanol, ethanol, isopropanol, n-propanol, acetone, etc.), inorganic salts, pH modulators, etc.

Specifically, water-miscible organic solvents are preferred because tiny undissolved flour-like coagula are minimized which are formed when fine inorganic particles and a cationic polymer are mixed. Such a water-miscible organic solvent is incorporated into a dispersion preferably in an amount of 0.1 to 20 weight percent, and more preferably in an amount of 0.5 to 10 weight percent.

The pH while preparing a cationic dispersion can vary widely depending on the types of fine inorganic particles, the types of cationic polymers, the various types of additives, etc. Generally, however, the pH should be between 1 and 8, and is most preferably between 2 and 7.

Into the dispersion prepared as described above, polyvinyl alcohol as a water-soluble binder is then added. In the present invention, an aqueous low-polymerized polyvinyl alcohol solution and an aqueous high-polymerized polyvinyl alcohol solution are added in the cited order. Polyvinyl alcohols, as described herein, include cation-modified polyvinyl alcohols, as well as low-polymerized and high-polymerized polyvinyl alcohols.

The high-polymerized polyvinyl alcohol solution may be added after the completion of the addition of the low-polymerized polyvinyl alcohol solution, or may be added after the start and before the completion of the addition of the low-polymerized polyvinyl alcohol solution.

The cation-modified polyvinyl alcohol is obtained by saponifying a copolymer of ethylenic unsaturated monomers having a cationic group with vinyl acetate.

Listed as ethylenic unsaturated monomers having a cationic group are, for example, trimethyl-(2-acrylamide-2,2-dimethylethyl)ammonium chloride, trimethyl-(3-acrylamide-3,3-dimethylpropyl)ammonium chloride, N-vinylimidazole, N-vinyl-2-methylimidazole, N-(3-dimethylaminopropyl)methacrylamide, hydroxylethyldimethyl(3-methacrylamide)ammonium chloride, trimethyl-(3-methacrylamidopropyl)ammonium chloride, N-(1,1-dimethyl-3-dimethylaminopropyl) acrylamide, etc.

The content ratio of the monomer containing a cation-modified group in cation-modified polyvinyl alcohol is between 0.1 and 10 mole percent of vinyl acetate, and is preferably between 0.2 and 5 mole percent.

High-polymerized polyvinyl alcohol having an average polymerization degree of 1,000 to 4,000 is preferably employed. Specifically, when employing an average polymerization degree of at least 2,000, and most preferably when using at least 3,000 thereof, the obtained layer preferably exhibits excellent brittleness. Furthermore, the degree of saponification of the above-mentioned high-polymerized polyvinyl alcohol is preferably between 70 and 100 percent, and is most preferably between 80 and 100 percent.

The average polymerization degree of the low-polymerized polyvinyl alcohol is preferably between 200 and 900, and as such polymerization degree, the degree which is the same as one for the high-polymerized polyvinyl alcohol may be employed.

The high-polymerized vinyl alcohol exclusively works as a binder for fine inorganic particles, while the low-polymerized vinyl alcohol is mainly employed to minimize coagulated clumps which form upon adding the high-polymerized polyvinyl alcohol.

Accordingly, the ratio of the low-polymerized vinyl alcohol to the high-polymerized vinyl alcohol is generally between 0.001 and 0.2, and is preferably between 0.05 and 0.15.

As hydrophilic binders, in addition to the above-mentioned polyvinyl alcohols, other water-soluble polymers can be employed in combination, and listed, for example, are gelatin (acid-processed gelatin is preferred), polyvinyl pyrrolidone (preferably having an average molecular weight of at least 200,000), Pullulan, polyethylene glycol (preferably having an average molecular weight of at least 100,000), hydroxyethyl cellulose, dextran, dextrin, water-soluble polyvinyl butyral, etc. These hydrophilic binders are generally employed in an amount of no more than 50 weight percent of polyvinyl alcohol, and preferably in an amount of no more than 30 weight percent.

The employed weight ratio of the above-mentioned polyvinyl alcohol to fine inorganic particles is generally between 1:3 and 1:10, and is preferably between 1:4 and 1:8.

The preferred method of adding an aqueous polyvinyl solution to the above-mentioned dispersion is that the aqueous polyvinyl solution is added while stirring. In such cases, temperature is preferably maintained in the range of 30 to 50° C. When the temperature is below 30° C., the viscosity of a coating composition becomes excessively high and stirring efficiency is degraded, and tends to form coagula and undissolved flour-like particles locally.

Furthermore, when the temperature exceeds 50° C., the coating composition tends to deteriorate such as in an increase in viscosity, etc.

Various types of additives can be incorporated into the coating composition prepared as described above. These additives may be incorporated prior to adding the above-mentioned water-soluble polymers.

After that, the above-mentioned coating composition is preferably coated onto a support without carrying out mechanical dispersion.

When such a coating composition is mechanically dispersed, the coating composition becomes uniform. However, cracking tends to occur.

The mechanical dispersion as described herein refers to dispersion which is carried out employing any of various types of homogenizers described above, and ordinary stirring (generally, at no more than 1,000 rpm) does not cause problems.

The coating composition of the present invention may be applied to various uses, for example, to an optional layer (for example, a photosensitive layer, an interlayer, a protective layer, a subbing layer, etc.) of various types of silver halide light-sensitive photographic materials; an ink receptive layer of an ink-jet recording sheet; a receptive layer of a thermal transfer recording sheet; a dye image receiving layer of a diffusion transfer-type light-sensitive photographic material, etc. Specifically, when applied to the ink receptive layer of the ink-jet recording sheet, it is preferably employed because a coated layer with a thick layer is obtained which has neither cracking nor coating unevenness, and has a high void layer and high ink absorbability.

In addition to those describe above, various types of additives can be incorporated into the aqueous coating composition of the present invention.

Of these, cation mordants are preferred because they enhance water resistance as well as moisture resistance after printing.

Employed as such cationic mordants are polymer mordants having a primary, secondary, and tertiary amino group, and a quaternary ammonium salt group. Polymer mordants having a quaternary ammonium salt group are preferred because discoloration and degradation of light fastness during the elapse of time are minimal, and the mordant ability for dyes is high enough.

The preferred polymer mordants can be obtained as a homopolymer of monomers having the above-mentioned quaternary ammonium salt group or a copolymer or a condensation polymer of the same monomers along with other monomers.

Incorporated as additives other than those described above, can be UV absorbers described in Japanese Patent Publication Open to Public Inspection Nos. 57-74193, 57-87988, and 62-261476; anti-discoloring agents described in Japanese Patent Publication Open to Public Inspection Nos. 57-74192, 57-87989, 60-72785, 61-146591, 1-95091, and 3-13376; various types of anionic, cationic and nonionic surface active agents; fluorescent whitening agents described in Japanese Patent Publication Open to Public Inspection Nos. 59-42993, 59-52689, 62-280069, 61-242871, and 4-219266; and also various types of additives known in the art such as antifoaming agents, lubricants such as diethylene glycol, etc., antiseptics, thickeners, antistatic agents, matting agents, etc.

A coating and drying method is described below, in which the aqueous coating composition of the present invention is effectively applied onto a support.

Any support known in the art can be employed, however, the preferred supports are those which do not absorb water in the coating composition.

Such non-water absorbing supports include, for example, transparent film composed of materials such as polyester series film, diacetate series film, triacetate series film, acrylic series film, polycarbonate series film, polyvinyl chloride series film, polyimide series film, cellophane, celluloid, etc., or translucent or opaque supports such as resin coated paper (so-called RC paper) which has, on at least one surface of the paper support, a polyolefin resin coated layer into which a white pigment, etc. are added, and so-called white PET prepared by incorporating white pigments such as titanium oxide, barium sulfate, etc. into polyethylene terephthalate.

Upon applying the coating composition of the present invention onto the above-mentioned support, with the purpose of increasing the adhesion strength of the surface with the coated layer, corona discharging, subbing, etc. are preferably carried out. Further, the recording sheet of the present invention need not always be white, so that colored supports may also be employed.

As the ink-jet recording sheet of the present invention, a paper support which is laminated with polyethylene on both surfaces is particularly preferred because recorded images approach photographic qualities and are obtained at relatively low cost. Such a polyethylene laminated paper support is described below.

Paper employed for a paper support is produced employing wood pulp as a main raw material, and in addition, synthetic pulp such as polypropylene, etc. or synthetic fiber such as nylon, polyester, etc., if required. As the wood pulp, any of LBKP, LBSP, NBKP, NBSP, LDP, NDP, LUKP, and NUKP can be employed. However, LBKP, NBSP, LBSP, NDP, and LDP having a shorter fiber portion are preferably employed in a larger ratio. However, a content ratio of LBSP and/or LDP is preferably between 10 and 70 weight percent.

As the above-mentioned pulp, chemical pulp (sulfate salt pulp or sulfite pulp) containing minimum impurities is preferably employed, and pulp which is subjected to bleaching treatment to increase whiteness is also beneficial.

Into the paper, can appropriately be added higher fatty acids, sizing agents such as alkylketene dimer, etc., white pigments such as calcium carbonate, talc, titanium oxide, etc., paper strengthening agents such as starch, polyacrylamide, polyvinyl alcohol, etc., fluorescent whitening agents, moisture maintaining agents such as polyethylene glycol, etc., dispersing agents, softening agents such as quaternary ammonium, etc.

The degree of water freeness of pulp employed for paper-making is preferably between 200 and 500 cc according to CSF specification. Furthermore, the sum of weight percent of 24-mesh residue and weight percent of 42-mesh calculated portion regarding the fiber length after beating, specified in JIS-P-8207 is preferably between 30 and 70 percent. Further, the weight percent of 4-mesh residue is preferably not more than 20 weight percent.

The weight of the paper is preferably between 30 and 250 $g/m^2{}_1$ and is most preferably between 50 and 200 $g/m^2$. The thickness of the paper is preferably between 40 and 250 $\mu$m.

The paper is calendered, during or after paper-making process, to result in enhanced smoothness. The density of the paper is generally between 0.7 and 1.2 $g/m^2$ (JIS-P-8118). Furthermore, the rigidity of the base paper is preferably between 20 and 200 g under conditions specified in JIS-P-8143.

A surface sizing agent may be coated onto the surface of the paper. As surface sizing agents, the same as those described above which can be incorporated into the paper can be employed.

The pH of the paper, when measured employing a hot water extraction method specified in JIS-P-8113, is preferably between 5 and 9.

As polyethylene which covers both surfaces of the paper, low density polyethylene (LDPE) and/or high density polyethylene (HDPE) is mainly employed. However, other than these, LLDPE, polypropylene, etc. can be partially employed.

Specifically, a polyethylene layer on the surface of an ink receptive layer is preferably one in which, as carried out in photographic paper, rutile- or anatase-type titanium oxide is incorporated into polyethylene, and opacity as well as whiteness are improved. The content of titanium oxide is generally between 3 and 20 percent by weight of polyethylene, and is preferably between 4 and 13 percent by weight.

Polyethylene coated paper can be employed as glossy paper. Furthermore, in the present invention, polyethylene coated paper having a matte or silk surface can also be employed, which is prepared by embossing when polyethylene is melt-extrude-coated onto the surface of the paper.

The employed amount of polyethylene on both surfaces of the paper is determined so that after providing an ink receptive layer and a backing layer, tendency to curl is minimized under low and high humidity. Generally, the thickness of the polyethylene layer on the ink receptive layer side is in the range of 20 to 40 μm and that of the backing layer side is in the range of 10 to 30 μm.

Furthermore, the above-mentioned polyethylene coated paper support having the following characteristics is preferably employed:

1. tensile strength: being strength specified in JIS-P-8113, 2 to 30 kg in the longitudinal direction, and 1 to 20 kg in the lateral direction
2. tear strength: to be 10 to 200 g in the longitudinal direction and 20 to 200 g in the lateral direction in accordance with the method specified in JIS-P-8116
3. compression elastic modulus: 103 kgf/cm$^2$ or more
4. Beck surface smoothness: preferably not less than 20-second light for a gloss surface under conditions specified in JIS-P-811, and for embossed paper support, acceptable for less than this value
5. surface roughness: surface roughness specified in JIS-B-0601 is preferably at the greatest height no more than 10 μm per standard length of 2.5 mm
6. opacity: to be at least 80%, and preferably between 85 and 98% when measured by the method specified in JIS-P-8138
7. whiteness: L*, a*, and b* specified in JIS-Z-8729 are preferably L*=80 to 95, a*=−3 to +5, and b*=−6 to +2
8. surface glossiness: mirror surface glossiness at 60 degrees, specified in JIS-Z-8741, is preferably between 10 and 95%
9. Clark rigidity: a support having a Clark rigidity of 50 to 300 cm$^2$/100, in the conveying direction of the recording sheet, is preferred
10. moisture content in center stock: to be generally between 2 and 10 weight percent of the center stock, and preferably between 2 and 6 weight percent.

The mechanical dispersion as described herein refers to dispersion which is carried out employing any of various types of homogenizers described above, and ordinary stirring (generally, at no more than 1,000 rpm) does not cause problems.

Other than those described above, various types of additives may be incorporated into a void layer, and other layers provided as required, of the recording sheet of the present invention.

Incorporated may be, for example, fine organic latex particles of polystyrene, polyacrylic acid esters, polymethacrylic acid esters, polyacrylamides, polyethylene, polypropylene, polyvinyl chloride, polyvinylidene chloride, or copolymers thereof, urea resins, or melamine resins, etc.; fine oil droplets of liquid paraffin, dioctyl phthalate, tricresyl phosphate, silicone oil, etc.; various types of cationic or nonionic surface active agents; UV absorbers described in Japanese Patent Publication Open to Public Inspection Nos. 57-74193, 57-87988, and 62-261476; anti-discoloring agents described in Japanese Patent Publication Open to Public Inspection Nos. 57-74192, 57-87989, 60-72785, 61-146591, 1-95091, and 3-13376; fluorescent whitening agents described in Japanese Patent Publication Open to Public Inspection Nos. 59-42993, 59-52689, 62-280069, 61-242871, and 4-219266; and various types of additives known in the art such as pH regulators, for example, sulfuric acid, phosphoric acid, citric acid, sodium hydroxide, potassium carbonate, etc.; antifoaming agents, antiseptics, thickeners, antistatic agents, matting agents, etc.

The void volume of recording sheets of the present invention is generally between 20 and 40 ml/m$^2$, and the void ratio of the void layer is generally between 0.5 and 0.8.

The above-mentioned void layers may be composed of two layers or more, and in this case, the compositions of these layers may be the same or different.

In one embodiment of the present invention, after coating is carried out employing any of the above-mentioned methods, the coated layer is preferably chilled temporarily below 20° C. By so doing, the viscosity of the coating composition is increased and after coating, a strong three dimensional structure is formed, thereby the layer tends not to crack.

It is assumed that the resulting three dimensional structure is formed through complicated interlocking of polyvinyl alcohol, fine inorganic particles, boric acid salt and a cationic polymer.

Such chilling can be carried out by passing the coated layer through an atmosphere maintained at no more than 20° C., preferably at no more than 15° C., and most preferably at 10° C. The period of time while the coated layer is left at such temperature varies depending on the temperature of the coating composition to be coated, the wet layer thickness, the thickness of the support, etc. However, at ordinary coating temperature (35 to 50° C.), the period of time is generally in the range of 5 to 100 seconds, and preferably in the range of 10 to 50 seconds.

After chilling, drying is preferably carried out employing blown air at 20 to 70° C. In such cases, when high temperature drying is carried out immediately after a chilling zone, the three dimensional structure once formed tends to be destroyed and thus, generally, the drying temperature after chilling is preferably no greater than 50° C.

The humidity of air for drying is generally in the range of 10 to 50 percent. However, after complete drying, moisture content is preferably adjusted at relative humidity of 20 to 70 percent over the definite time of period (for example, for 20 to 180 seconds).

There may be formed one or more layers of the aqueous coating composition of the present invention on one side of a support. When there are a plurality of layers, one of them may be a void layer. However, when simultaneous coating is carried out, from the viewpoint of optimal coating, the void layer is preferably formed employing the coating composition which shows characteristics such as an increases in viscosity or the formation of gel at a low temperature, in the same manner as the aqueous composition of the present invention.

The method of applying the aqueous coating composition of the present invention can be selected from the most appropriate methods known in the art. The preferred method is such that the coating composition which forms a plurality of layers is applied onto a support and subsequently dried. In the case of a multilayer constitution, at least two layers can be simultaneously coated and specifically, a simultaneous coating is economically preferred in which all hydrophilic binder layers are simultaneously applied.

Employed as the preferred coating methods are a roll coating method, a rod bar coating method, an air knife coating method, a spray coating method, a curtain coating method, or an extrusion coating method employing a hopper, as described in U.S. Pat. No. 2,681,294.

From the viewpoint of the optimal viscosity of the aqueous coating composition of the present invention, when the composition is coated, a composition at 35 to 50° C. is preferably used, and the same at 36 to 48° C. is most preferred.

The viscosity of the coating composition of the present invention is relatively low during coating and those having a viscosity in the range of 10 to 100 cp at 40° C. are essential in terms of high speed coating.

After the coating composition of the present invention is coated onto a support, it is necessary that the coated composition be chilled, to markedly increase the viscosity.

Chilling temperature is preferably maintained below 20° C., and is more preferably maintained below 15° C.

Chilling can be achieved by passing a coated sample through a chilling zone maintained at below 10° C. for a specified period (preferably at least 5 seconds). During such chilling, excessively strong air should not be blown so that the evenness of a coated composition is maintained.

After being chilled, strong blasts of air do not tend to cause the unevenness of a coated composition due to an increase in viscosity and thus, the formation of unevenness of the coated composition can be minimized even though strong blasts of air are blown. Further, strong blasts of air having a temperature of at least 20° C. can be blown, and the temperature is preferably raised gradually.

Drying time is generally within 10 minutes, though it is dependent on the wet layer thickness, and is most preferably within 5 minutes.

Coating speed depends on the wet layer thickness and the drying capacity of an equipment, however, it is generally between 10 and 1,000 m per minute, and is preferably between 20 and 500 m per minute.

On an aqueous composition-coated side and its reverse side, various types of backing layers are preferably provided in order to minimize curling, sticking which is caused upon being piled up immediately after printing, and ink transfer. The constitution varies depending on the type of support, its thickness, the constitution of a surface side and its thickness, however, generally, a hydrophilic binder or a hydrophobic binder is employed. The thickness of the backing layer is generally in the range of 0.1 to 10 $\mu$m.

Furthermore, the surface of the backing layer can be roughened or matted in order to minimize sticking with other recording sheets, which also improves writability, and further, to improve conveyance properties in an ink-jet recording apparatus. For this purpose, fine organic or inorganic particles having a particle diameter of 2 to 20 $\mu$m are preferably employed.

Such backing layers may be provided in advance and may be provided after applying the coating composition of the present invention.

When the recording sheet of the present invention is to be employed for ink-jet printing, in the case of recording images employing an ink-jet recording sheet, a recording method using water-based ink is preferably employed.

The water-based ink as described herein is a recording liquid comprised of colorants described below, composition media, and other additives. Employed as colorants can be water-soluble dyes and water-dispersible pigments, known in the art regarding ink-jet printing such as direct dyes, acid dyes, basic dyes, reactive dyes, or food dyes, etc.

Listed as solvents of water-based inks are water and various water-soluble organic solvents, for example, alcohols such as methyl alcohol, isopropyl alcohol, n-butyl alcohol, tert-butyl alcohol, isobutyl alcohol, etc.; amides such as dimethylformamide, dimethylacetamide, etc.; ketones or ketone alcohols such as acetone, diacetone alcohol, etc.; ethers such as tetrahydrofran, dioxane, etc.; polyalkylene glycols such as polyethylene glycol, polypropylene glycol, etc.; polyhydric alcohols such as ethylene glycol, propylene glycol, butylene glycol, triethylene glycol, 1,2,6-hexanetriol, thioglycol, hexylene glycol, diethylene glycol, glycerin, triethanolamine, etc.; lower alkyl ethers of polyhydric alcohols such as ethylene glycol methyl ether, diethylene glycol methyl (or ethyl) ether, triethylene glycol monobutyl ether, etc.; etc.

Of a number of these water-soluble organic solvents, polyhydric alcohols such as diethylene glycol, triethanolamine, glycerin, etc., and lower alkyl ethers of polyhydric alcohols such as triethylene glycol monobutyl ether, etc., are preferred.

Other additives for the water-based inks include, for example, pH regulators, sequestering agents, mildewcides, viscosity modifiers, surface tension adjusting agents, wetting agents, surface active agents, rust preventives, etc.

In order to improve wettability onto a recording sheet, the water-based ink solution generally has, at 20° C., a surface tension in the range of 25 to 60 dyn/cm, and preferably in the range of 30 to 50 dyn/cm.

EXAMPLES

The present invention is explained with reference to examples. Further, "%" in the examples represents bone-dry weight percent, unless otherwise specified.

Example 1

Added to 110 liters of an aqueous solution C1 (having a pH of 2.5 and comprising 2 g of antifoaming agent SN381 manufactured by San Nobuko Co.) comprising 14 weight percent of mordant cationic polymer P-1, 5 weight percent of n-propanol, and 2 weight percent of ethanol were 450 liters of 20 percent aqueous dispersion A1 (having a pH of 2.3 and containing 1 weight percent ethanol) of uniformly dispersed gas phase method silica (A200, manufactured by Nihon Aerojiru Kogyo Co.) having an average particle diameter of primary particles of 0.012 $\mu$m, while stirring at room temperature.

Subsequently, 42 liters of aqueous mixed solution D containing boric acid and borax at the ratio of 1:1 (each concentration was 3 weight percent) were gradually added while stirring.

Next, dispersion was carried out at a pressure of 500 kg/cm$^2$ employing a high pressure homogenizer, manufactured by Sanwa Kogyo Co. The total volume of the resulting dispersion was then adjusted to 630 liters, using water, and nearly transparent dispersion B1 was obtained.

The resulting dispersion was filtered employing a TCP-30 type filter, manufactured by Advantex Toyo Co., having a filtering accuracy of 30 $\mu$m.

Next, dispersion B2 was prepared in the same manner as B1, except that in dispersion B1, mixed solution D containing boric acid and borax was not added (the same volume of water was employed instead).

Next, employing the above-mentioned dispersion, additives described below were successively added, and a coating composition (CS1) was prepared (the prepared volume was adjusted to 1 liter).

| | |
|---|---|
| Silica dispersion B1 | 580 ml |
| Polyvinyl alcohol (PVA203, manufactured by Kuraray Co.) 10% aqueous solution | 5 ml |
| Polyvinyl alcohol (PVA235, manufactured by Kuraray Co.) 5% aqueous solution | 250 ml |
| Silicone dispersion (BY-22-839, manufactured by Toray-Dow Corning-Silicone Co.) | 30 ml |
| Latex dispersion (AE803, manufactured by Showa Kobunshi Kogyo Co.) | 20 ml |
| Ethanol | 8.5 ml |
| Deionized water to make | 1000 ml |

The pH of obtained coating composition CS1 was 4.2 at 40° C.

The viscosity of the coating composition was measured at 40° C. and 15° C., and the values shown in Table 1 were obtained.

Next, coating compositions CS2 through CS9 were prepared in the same manner as CS1, employing dispersion B1 or B2, and further, changing the volume of B1 or B2 and the added amount of polyvinyl alcohol (PVA 235) as shown in Table 1. However, each total volume was adjusted to 1 liter using deionized water, and each pH was adjusted to that of CS1 using an aqueous nitric acid or potassium carbonate solution. The viscosity of each coating composition was measured at 40° C. and 15° C. Table 1 shows the results.

The same amount of polyethylene oxide (having an average molecular weight of about 100,000) in place of polyvinyl alcohol was added into CS7.

Next, each coating composition was filtered three times, using a 25 μm filter, and was coated onto a support covered with polyethylene on both sides so as to obtain a wet layer thickness of 200 μm. The resulting coating was passed through a chilling zone for 20 seconds to lower the temperature of the coating surface to 13° C., and was dried for 60 seconds with 30° C. air, for another 60 seconds with 45° C. air, and for still another 60 seconds with 50° C. air. Thus, an ink-jet recording sheet was prepared. The state of the obtained layer surface was visually inspected and the results shown in Table 1 were obtained.

The coated layer surface was evaluated as follows:
A: no unevenness due to unevenness of the coated composition is noted
B: no major problem was observed except for partial setting unevenness caused by blasts of air near the edges
C: some unevenness is observed over the entire surface, however, not to the level which would cause practical problems
D: unevenness is clearly observed, to the level of commercial non-viability

TABLE 1

| Coating composition | B1 or B2 (in ml) | Volume of PVA235 | F/C | Viscosity (in cp) 40° C. | Viscosity (in cp) 15° C. | Coated Layer Surface |
|---|---|---|---|---|---|---|
| CS1 | B1 (580 ml) | 250 ml | 6.63 | 52 | 12,000 | A |
| CS2 | B1 (500 ml) | 290 ml | 4.93 | 48 | 3,500 | B |
| CS3 | B1 (400 ml) | 350 ml | 3.27 | 39 | 1,100 | C |
| CS4 | B1 (350 ml) | 430 ml | 2.33 | 32 | 500 | D |
| CS5 | not added | 250 ml | 0 | 26 | 180 | D |
| CS6 | not added | 650 ml | 0 | 94 | 430 | D |
| CS7 | B1 (580 ml) | not added | — | 21 | 43 | D |
| CS8 | B2 (590 ml) | 250 ml | 6.63 | 31 | 280 | D |
| CS9 | B1 (650 ml) | 180 ml | 10.3 | 79 | 17,000 | A |

F/C represents the weight ratio of silica particles to polyvinyl alcohol.
CS9 results in no unevenness, however results in partial coating defects of crack-like and layer peeling.

As can been seen from results in Table 1, CS1, CS2, CS3, and CS9, which have a viscosity at 15° C. of at least 20 times as much as that at 40° C., resulted in a great decrease of air impinged unevenness due to the unevenness of the coated composition, compared to coating compositions which exhibit a viscosity increase of 20 times or less. Specifically, CS1, CS2, and CS9, which exhibit a viscosity increase of at least 100 times, resulted in a minimum air impinged unevenness.

However, CS9, having a high ratio of fine inorganic particles exhibited major cracking on the coated layer surface.

On the other hand, marked air impinged unevenness, due to the lack of increase in viscosity at a lower temperature, resulted in CS4, in which fine inorganic particles, polyvinyl alcohol and boric acid are employed, but the viscosity at 15° C. is 20 times less than at 40° C.; CS5 and CS6 in which fine inorganic particles are not employed; CS7 employed no polyethylene oxide instead of polyvinyl alcohol; and CS8 employed no boric acid.

Example 2

Coating compositions CS10 through CS15 were prepared in the same manner as CS1, while in coating composition CS1 prepared in Example 1, the pH of each coating composition was adjusted to the value in Table 2, by employing aqueous nitric acid or sodium carbonate solution. Table 2 shows the viscosity of the obtained coating composition.

Further, in the same manner as Example 1, each coating composition was applied onto a support and subsequently dried. The state of each layer surface was then evaluated.

Table 2 shows the results.

TABLE 2

| Coating composition | PH | Viscosity (in cp) 40° C. | Viscosity (in cp) 15° C. | Coated Layer Surface |
|---|---|---|---|---|
| CS10 | 3.2 | 88 | 1,200 | D |
| CS11 | 3.8 | 72 | 3,100 | B |
| CS12 | 4.6 | 43 | 16,000 | A |
| CS13 | 5.6 | 92 | gelled | A |
| CS14 | 6.2 | 450 | gelled | (*) |

(*) Coating was impossible

Of coating compositions in which the viscosity at 15° C. is at least 20 times as much as that at 40° C., CS11, CS12, and CS13 resulted in minimum air impinged unevenness to form an excellent layer surface. However, CS10 exhibiting an increase in viscosity of less than 20 times, resulting in marked air impinged unevenness.

Furthermore, it was impossible to coat CS14 at a wet layer thickness of 200 μm, which exhibited a sufficient viscosity ratio, but had a viscosity of 450 cp at 40° C.

Example 3

During preparing CS1 employed in Example 1, a coating composition (CS20) in which the total volume was adjusted to 920 ml was prepared and a coating composition (CS21) in which saponin was added to the resulting composition so as to obtain 2 weight percent was prepared. These were evaluated in the same manner as Example 2. Table 3 shows the results.

TABLE 3

| Coating composition | Viscosity (in cp) 40° C. | Viscosity (in cp) 15° C. | Coated Layer Surface |
|---|---|---|---|
| CS20 | 420 | gelled | (*) |
| CS21 | 81 | 22,000 | A |

(*) Coating was impossible

Table 3 reveals that when coating composition CS1 is concentrated, entire viscosity increases to a great extent, but by the addition of a surface active agent, viscosity properties similar to those of CS1 are obtained.

Example 4

Employing coating composition CS1 prepared in Example 1, coating was carried out while changing the drying conditions as described below.
(A) after coating, drying was carried out under a direct air blast of 60° C. hot air for 3 minutes
(B) after coating, drying was carried out under a direct air blast of 40° C. air for 5 minutes
(C) after coating, drying was carried out under a direct air blast of 30° C. air for 10 minutes
(D) after coating, drying was carried out under a direct air blast of 40° C. air for 20 minutes
(E) after coating, drying was carried out under the same conditions as Example 1, by regulating the layer surface temperature to 17° C through the passage of a 0° C. zone for 10 seconds
(F) after coating, drying was carried out under the same conditions as Example 1, by regulating the layer surface temperature to 22° C. through the passage of a 0° C. zone for 5 seconds
(G) drying was carried out under the same conditions as (E), except that the temperature of the coating composition was raised from 40° C. to 50° C., and after passing through a 0° C. zone for 10 seconds, the temperature of the layer surface was 24° C.

Each of the above-mentioned layer surfaces was evaluated. Table 4 shows the results. In Table 4, the lowest temperature of the layer surface during drying is shown.

TABLE 4

| Coating | Lowest Temperature | Coated Layer Surface |
|---|---|---|
| (A) | 31° C. | C |
| (B) | 26° C. | C |
| (C) | 22° C. | C |
| (D) | 18° C. | C |
| (E) | 17° C. | B |
| (F) | 21° C. | C |
| (G) | 22° C. | C |

Coating Lowest Temperature

In Coating (D), the lowest temperature of the layer surface was lowered down to 18° C. During lowering of the temperature, air was blasted.

In Coatings (A), (B), (C), (F), and (G), the lowest temperature of the layer surface reached no more than 20° C. and setting unevenness caused by air blast was evident on all.

In Coating (E), the coated layer surface was not chilled to (no more than 13° C.) as in Example 1, however, almost no unevenness occurred.

Example 5
Preparation of Titanium Oxide Dispersion-1

Added to 90 liters of an aqueous solution comprising 150 g of sodium tripolyphosphate having a pH of 7.5, 500 g of polyvinyl alcohol (PVA 235, manufactured by Kuraray Co., Ltd.), 150 g of a cationic polymer (p-9), 10 g of an antifoaming agent, SN381 manufactured by San Nobuko Co. Ltd. was 20 kg of titanium oxide (W-10, manufactured by Ishihara Sangyo Co.) having an average diameter of approximately 0.25 μm. The resulting mixture was dispersed employing a high pressure homogenizer (manufactured by Sanwa Kogyo Co., Ltd.), and the total volume was then adjusted to 100 liters. Thus uniform Titanium Oxide Dispersion-1 was prepared.

Preparation of Silica Dispersion-1

Into 620 liters of deionized water of which pH was adjusted to 2.5 using nitric acid, 125 kg of silica (A300, manufactured by Nihon Aerojiru Co., Ltd.) having an average primary particle diameter of approximately 0.007 μm prepared using a gas phase method, were suction-dispersed employing a jet-stream inductor mixer TDS manufactured by Mitamura Riken Kogyo Co., Ltd., and the total volume was then adjusted to 649 liters using deionized water. The resulting dispersion was diluted, and the particles were photographed using an electron microscope. It was confirmed that almost all the particles had a diameter of no more than 0.01 μm and were dispersed into primary particles.

Silica Dispersion-2

Added to 18 liters of a solution (having a pH of 2.3) comprising 1.42 kg of a cationic polymer (P-13) and 4.2 liters of ethanol, were 69.4 liters of Silica Dispersion-1 with stirring at the temperature range of 25 to 30° C. over 20 minutes, followed by adding 7.0 liters of an aqueous solution (having a pH of 7.3) comprising 260 g of boric acid and 230 g of borax in combination over approximately 10 minutes, and further followed by adding 1 g of the above-mentioned antifoaming agent, SN381.

The resulting mixture was dispersed twice under a pressure of 250 kg/cm$^2$, using a high pressure homogenizer manufactured by Sanwa Kogyo Co., Ltd., and the total volume was adjusted to 97 liters using deionized water. Thus, almost transparent Silica Dispersion-2 was prepared. The pH of the resulting dispersion was approximately 4.2.

Preparation of Fluorescent Whitening Agent Dispersion-1

In a mixture of 9,000 g of diisodecyl phthalate and 12 liters of ethyl acetate, 400 g of an oil-soluble fluorescent whitening agent, UVIYEX-OB manufactured by Ciba- Geigy Co., Ltd., were thermally dissolved, and the resulting mixture was added and mixed with 65 liters of an aqueous solution comprising 3,500 g of acid-processed gelatin, a cationic polymer (P-13), and 6,000 ml of a 50 percent aqueous saponin solution. The resulting mixture was dispersed three times under a pressure of 250 kg/cm$^2$ employing a high pressure homogenizer, manufactured by Sanwa Kogyo Co., Ltd., followed by removal of ethyl acetate under vacuum. The total volume was then adjusted to 100 liters. The pH of the resulting dispersion was approximately 5.3.

Preparation of Matting Agent Dispersion-1

Added to 7 liters of deionized water containing 3 g of the above-mentioned PVA 235, were 56 g of a methacrylic acid ester series matting agent MX-1500H manufactured by Soken Kagaku Co., Ltd., and the resulting mixture was dispersed for 30 minutes using a high speed homogenizer. The total volume was then adjusted to 7.8 liters. The pH of the resulting dispersion was approximately 5.2.

Preparation of Coating Compositions

First layer, second layer, and third layer coating compositions were prepared using the steps described below.

First Coating Composition:

Additives described below were successively added to 600 ml of Silica Dispersion-2 with stirring at 40° C.
(1) 10% aqueous polyvinyl alcohol (PVA 203, manufactured by Kuraray Co., Ltd.) solution: 6 ml
(2) 5% aqueous polyvinyl alcohol (PVA 235, manufactured by Kuraray Co., Ltd.) solution: 260 ml
(3) Fluorescent Whitening Agent Dispersion-1: 25 ml
(4) Titanium Oxide Dispersion-1: 33 ml
(5) Latex Emulsion AE-803 manufactured by Daiichi Kogyo Co., Ltd.: 18 ml
(6) the total volume was adjusted to 1,000 ml using deionized water. The pH of the coating composition was approximately 4.4.

Second Layer Coating Composition

With 650 ml of Silica Dispersion 2, additives described below were successively mixed with stirring at 40° C.
(1) 10% aqueous polyvinyl alcohol (PVA 203, manufactured by Kuraray Co., Ltd.) solution: 6 ml
(2) 5% aqueous polyvinyl alcohol (PVA 235, manufactured by Kuraray Co., Ltd.) solution: 270 ml
(3) Fluorescent Whitening Agent Dispersion-1: 35 ml
(4) Anti-discoloring agent-1: 20 ml
(5) the total volume was adjusted to 1,000 ml using deionized water. The pH of the coating composition was approximately 4.4.

Third Layer Coating Composition:

With 650 ml of Silica Dispersion 2, additives described below were successively mixed with stirring at 40° C.
(1) 10% aqueous polyvinyl alcohol (PVA 203, manufactured by Kuraray Co., Ltd.) solution: 6 ml
(2) 5% aqueous polyvinyl alcohol (PVA 235, manufactured by Kuraray Co., Ltd.) solution: 270 ml
(3) Silicone Dispersion (BY-22-839, manufactured by Toray.Dow Corning.Silicone Co., Ltd.): 15 ml
(4) 50 percent aqueous saponin solution: 4 ml
(5) Matting Agent Dispersion-1: 10 ml
(6) the total volume was adjusted to 1,000 ml using deionized water. The pH of the coating composition was approximately 4.5.

A preparation of 5% aqueous Anti-discoloring Agent-1 solution: 5 g of N,N-disulfoethylhydroxylamine-2 sodium salt was dissolved in 90 ml of water containing 3 g of a cationic polymer (P-13), and the total volume was adjusted to 100 ml.

The coating compositions prepared as described above were filtered using filters described below.

First layer and second layer: two steps each using TCP 10 manufactured by Toyo Roshi Co., Ltd.

Third layer: two steps each using TCP 30 manufactured by Toyo Roshi Co., Ltd.

Onto a paper support coated with polyethylene on both surfaces (having a thickness of 220 μm and in the polyethylene on the ink absorbing layer surface, 13 weight percent of anatase-type titanium oxide was incorporated), each layer was coated in the order of the first layer (50 μm), the second layer (100 μm), and the third layer (50 μm). The parenthesis represents the wet-thickness, and the first, second, and third layers were simultaneously coated.

Each coating composition was coated at 40° C. employing a 3-layer system slide hopper; immediately after coating, the coated layers were chilled for 20 seconds in a chilling zone maintained at 0° C., and were successively dried with air (at a relative humidity of 15%) at 25° C. for 60 seconds, air (at a relative humidity of 25%) at 45° C. for 60 seconds, and air (at a relative humidity of 25%) at 50° C. for 60 seconds; was conditioned for two minutes under an atmosphere of 20 to 25° C. and a relative humidity of 40 to 60 percent. The sample was wound and Recording Sheet 1 was thus obtained.

Recording Sheets 2 through 10 were prepared by changing Recording Sheet 1 as described below. Further, points changed in each recording sheet were changed in the same manner for each layer.

Recording Sheet 2: prepared in the same manner as Recording Sheet 1, except that in the preparation of "Silica Dispersion-2", the addition order was changed to the sequence of Silica Dispersion, an aqueous cationic polymer-containing solution, followed by adding a boric acid and borax containing solution and an antifoaming agent.

In this case, during mixing, the viscosity of the mixture increased markedly. Stirring time prior to dispersion was extended to 2 hours compared to 5 minutes in the case of Recording Sheet 1, and the dispersion frequency with the use of a high pressure homogenizer was increased by a factor of 4.

Recording Sheet 3: prepared in the same manner as Recording Sheet 1, except that in the preparation of "Silica Dispersion-2" of Recording Sheet 1, into the aqueous cationic polymer solution, the above-mentioned aqueous boric acid/borax containing solution was added, followed by adding Silica Dispersion-1.

After mixing, the viscosity of the mixture increased markedly and stirring was carried out for 2 hours in the same manner as for Recording Sheet 2.

Recording Sheet 4: a coating composition prepared for Recording Sheet 1 was further dispersed once under the condition of 100 kg/cm$^2$ employing a high pressure homogenizer, and the resulting dispersion was coated.

Recording sheet 5: prepared in the same manner as Recording Sheet 1, except that when the coating composition was prepared employing "Silica Dispersion-2" for Recording Sheet 1, the low-polymerized polyvinyl alcohol was not used.

Recording Sheet 6: prepared in the same manner as Recording Sheet 1, except that "Silica Dispersion-2" for Recording Sheet 1 was used, and the addition order of the low-polymerized polyvinyl alcohol and the high-polymerized polyvinyl alcohol was reversed.

Recording Sheet 7: its coating composition was prepared in the same manner as Recording Sheet 1, except that in Recording Sheet 1, the boric acid and borax solution was not added prior to dispersion employing a high pressure homogenizer, but was added immediately prior to preparing the coating composition.

Recording Sheet 8: the coating composition prepared for Recording Sheet 7 was further dispersed once under the condition of 100 kg/cm$^2$ employing a high pressure homogenizer, and the resulting dispersion was coated.

Recording Sheet 9: in Recording Sheet 7, the coating composition was prepared by adding boric acid and borax, after the addition of PVA 235.

Recording Sheet 10: the coating composition prepared for Recording Sheet 9 was further dispersed once under the condition of 100 kg/cm$^2$ employing a high pressure homogenizer, and the resulting dispersion was coated.

Regarding Recording Sheets 1 through 10, the following items were evaluated:

(1) Glossiness: glossiness at 75 degrees was measured employing a variable-angle photometer (VGS-1001 DP) manufactured by Nihon Denshoku Kogyo Co., Ltd.

The greater the value, the better the glossiness is considered to be.

(2) Cracking: the number of cracks per 0.3 m$^2$ was counted visually.

When the number of cracks was no more than 10, no practical problems occurred.

(3) Maximum density: over-all printing of magenta was carried out employing an ink-jet printer DJ700 manufactured by Canon Co., Ltd. and the maximum reflection density was measured.

Table 5 shows the obtained results.

TABLE 5

| Recording Sheet | Glossiness | Cracking | Maximum Density |
| --- | --- | --- | --- |
| 1 (Present Invention) | 57% | 1 | 2.05 |
| 2 (Present Invention) | 53% | 3 | 2.06 |
| 3 (Present Invention) | 54% | 2 | 2.04 |
| 4 (Present Invention) | 60% | 7 | 2.06 |
| 5 (Comparative Example) | 56% | 32 | 2.03 |
| 6 (Comparative Example) | 54% | 45 | 2.04 |
| 7 (Comparative Example) | 46% | about 100 | 2.04 |
| 8 (Comparative Example) | 53% | 60 | 2.03 |
| 9 (Comparative Example) | 32% | about 200 | 1.95 |
| 10 (Comparative Example) | 40% | 92 | 2.03 |

The results in Table 5 show that Recording Sheet 1 is prepared employing the preferred method of the present invention, in which a gas phase method silica dispersion is added to a cationic polymer-containing solution, followed by the addition of boric acid salt; an excellent coated layer is obtained employing a dispersion prepared by stirring for a short period of time (5 minutes) and at minimum frequency of rotation of a high pressure homogenizer; furthermore, the maximum density is sufficiently high, and overall excellent results are obtained.

For Recording Sheet 2, the addition order of the cationic polymer and the fine inorganic particle dispersion was reversed. As a result, during mixing, a number of undissolved flour-like coagula were formed due to an increase in viscosity. However, by extending fully the period of time for stirring, properties almost equivalent to Recording Sheet 1 were obtained; the properties were markedly improved; a relatively uniform composition was formed, and an excellent dispersion was obtained by two stages of high pressure dispersion.

Furthermore, even in the case in which boric acid salt was added before the entire fine inorganic particle dispersion was not added to the aqueous cationic polymer solution, by extending fully a period of time for stirring, were obtained glossiness, cracking and maximum density which were almost equivalent to Recording Sheet 1. However, Recording Sheets 2 and 3 tended to have decreased somewhat glossiness and a slight increase in cracking as compared to Recording Sheet 1.

Recording Sheet 4, prepared by re-dispersing the coating composition for Recording Sheet 1, resulted in the tendency of an increase in glossiness, but the cracking increased only somewhat.

Recording Sheets 5 and 6, prepared by adding no low-polymerized polyvinyl alcohol prior to adding high-polymerized polyvinyl alcohol during preparing the coating composition, exhibited the same glossiness as the recording sheet of the present invention, but many cracks were formed due to fine undissolved flour-like particles formed during the preparation of the coating composition.

Furthermore, Recording Sheets 7 through 10, prepared by adding boric acid salts during preparing the coating solution, when re-dispersed, resulted in a remarkable increase in cracking, though cracking was somewhat improved through re-dispersion.

Example 6

Recording Sheets 1A through 10A were prepared in the same manner as Example 5, except that in Recording Sheets 1 through 10 employed in Example 1, high-polymerized polyvinyl alcohols were replaced with those having an average polymerization degree of 2,300, and were evaluated in the same manner as Example 5. Table 6 shows the results.

TABLE 6

| Recording Sheet | Glossiness | Cracking | Maximum Density |
| --- | --- | --- | --- |
| 1A (Present Invention) | 54% | 4 | 2.01 |
| 2A (Present Invention) | 52% | 6 | 2.01 |
| 3A (Present Invention) | 52% | 7 | 2.00 |
| 4A (Present Invention) | 55% | 11 | 1.99 |
| 5A (Comparative Example) | 51% | 56 | 1.95 |
| 6A (Comparative Example) | 49% | 82 | 1.96 |
| 7A (Comparative Example) | 43% | >200 | 1.92 |
| 8A (Comparative Example) | 48% | about 100 | 1.91 |
| 9A (Comparative Example) | 30% | >300 | 1.93 |
| 10A (Comparative Example) | 37% | about 200 | 1.94 |

The results in Table 6 show that by employing those in which the average polymerization degree of high-polymerized polyvinyl alcohols is reduced to 2,300 from 3,500, as a whole, glossiness decreases slightly, and cracking increases, but in the recording sheets of the present invention, glossiness is excellent and less cracking occurs.

Example 6

Recording Sheets 11 through 16 were prepared in the same manner as Recording Sheet 1, by changing drying conditions as described in Table 7 after coating, while employing the coating composition for Recording Sheet 1.

TABLE 7

| Recording Sheet | Chilling Zone Temperature/ Time | First Drying Temperature/ Humidity/ Time | Second Drying Temperature / Humidity/ Time | Third Drying Temperature/ Humidity/ Time |
| --- | --- | --- | --- | --- |
| 1 | 0° C./ 20 seconds | 25° C./15%/ 60 seconds | 45° C./25%/ 60 seconds | 50° C./25%/ 60 seconds |

TABLE 7-continued

| Recording Sheet | Chilling Zone Temperature/ Time | First Drying Temperature/ Humidity/ Time | Second Drying Temperature / Humidity/ Time | Third Drying Temperature/ Humidity/ Time |
|---|---|---|---|---|
| 11 | 5° C./ 20 seconds | 30° C./20%/ 60 seconds | 50° C./25%/ 60 seconds | 55° C./20%/ 60 seconds |
| 12 | 10° C./ 20 seconds | 30° C./20%/ 60 seconds | 50° C./25%/ 60 seconds | 55° C./20%/ 60 seconds |
| 13 | 15° C./ 20 seconds | 30° C./20%/ 60 seconds | 50° C./25%/ 60 seconds | 55° C./20%/ 60 seconds |
| 14 | 25° C./ 20 seconds | 30° C./20%/ 60 seconds | 50° C./25%/ 60 seconds | 55° C./20%/ 60 seconds |
| 15 | 0° C./ 20 seconds | 45° C./25%/ 60 seconds | 50° C./25%/ 60 seconds | 55° C./25%/ 60 seconds |
| 16 | 0° C./ 20 seconds | 55° C./25%/ 60 seconds | 55° C./25%/ 60 seconds | 55° C./25%/ 60 seconds |

Recording Sheets 11 through 16 were evaluated in the same manner as Example 5, and the results shown in Table 8 were obtained.

TABLE 8

| Recording Sheet | Glossiness | Cracking | Maximum Density |
|---|---|---|---|
| 1 | 57% | 1 | 2.05 |
| 11 | 57% | 1 | 2.03 |
| 12 | 56% | 2 | 2.04 |
| 13 | 52% | 11 | 2.03 |
| 14 | 47% | 31 | 2.03 |
| 15 | 52% | 10 | 2.02 |
| 16 | 43% | 22 | 2.01 |

From the results shown in Table 8, it is found that with a rise of recording sheet chilling temperature immediately after coating, glossiness decreases slightly, while cracking increases, and particularly, Recording Sheet 14, in which the temperature was raised to at least 20° C., results in rapid deterioration in cracking.

On the other hand, when the temperature is raised rapidly after chilling temporarily, degradation of glossiness and cracking is noticed.

According to the present invention, it is possible to obtain a uniform and evenly coated layer under high speed coating without forming the unevenness of the coated composition, even while coating under a large dry layer thickness an aqueous coating composition which is substantially not comprised of gelatin.

As specifically proven in the Examples, an ink-jet recording sheet of the present invention, which is prepared by coating, onto a support, a coating composition prepared by mixing a cationic polymer and a fine organic particle pigment dispersion including a hydrophilic binder, exhibits excellent advantages such as excellent glossiness, improved cracking.

What is claimed is:

1. An ink-jet recording sheet produced by a method comprising the steps of:
   (a) coating onto a support, a coating composition comprising fine inorganic particles, polyvinyl alcohol and boric acid or salts thereof, said coating composition having a first viscosity of 10 to 100 cp at 40° C., and a second viscosity at 15° C. which is at least 20 times of said first viscosity;
   (b) chilling said coated layer to a temperature which does not exceed 20° C. to form a chilled layer; and
   (c) drying said chilled layer by air blown at a temperature of at least 20° C.

2. An ink-jet recording sheet which is a product of the process of coating onto a support, a coating composition comprising fine inorganic particles, polyvinyl alcohol, and boric acid or salts thereof, said coating composition having a first viscosity of 10 to 100 cp at 40° C., and a second viscosity at 15° C. which is at least 20 times said first viscosity.

3. The ink-jet recording sheet of claim 2 wherein said fine inorganic particles are silica and produced by employing a gas phase method.

4. The ink jet recording sheet of claim 2 wherein a pH of said coating composition is between 3.5 and 6.0.

5. The ink jet recording sheet of claim 2 wherein a weight ratio of said fine inorganic particles to said polyvinyl alcohol is 3 to 10.

6. The ink jet recording sheet of claim 2 wherein said fine inorganic particles have an average diameter of not less than 3 nm to no more than 1 μm.

7. The ink jet recording sheet of claim 2 wherein said fine inorganic particles are between 3% and 20% by weight based on said coating composition and said polyvinyl alcohol is between 1% and 10% by weight based on said coating composition.

8. The ink jet recording sheet of claim wherein said boric acid or salts thereof is between 1% and 60% by weight based on said coating composition.

9. The ink jet recording sheet of claim 8 wherein a weight ratio of said fine inorganic particles to said polyvinyl alcohol is 3 to 10.

10. The ink jet recording sheet of claim 9 wherein said second viscosity is at least 50 times said first viscosity.

11. The ink jet recording sheet of claim 2 wherein a first viscosity of said coating composition at 15° C. is at least 50 times a second viscosity of said coating composition at 40° C.

12. The ink jet recording sheet of claim 2 wherein a weight ratio of said fine inorganic particles to said polyvinyl alcohol is 4:1 to 8:1.

13. A method for producing an ink jet recording sheet comprising
    coating, onto a support, a coating composition comprising fine inorganic particles, polyvinyl alcohol, and boric acid or salts thereof onto a support to form a coated layer wherein the coating composition has a first viscosity of 10 to 100 cp at 40° C., and a second viscosity at 15° C., which is at least 20 times said first viscosity,
    chilling said coated layer to a temperature which does not exceed 20° C. to form a chilled layer, and drying said chilled layer by air blown at a temperature of at least 20° C.

14. The method of claim 13 wherein said coated layer is chilled at temperatures lower than the temperature of said coating composition.

15. The method of claim 13 wherein said coating composition has a temperature of 35° to 50° C.

16. The method of claim 14 wherein said composition has a temperature of 35° to 50° C.

* * * * *